United States Patent
Wu et al.

(10) Patent No.: US 10,567,165 B2
(45) Date of Patent: Feb. 18, 2020

(54) SECURE KEY TRANSMISSION PROTOCOL WITHOUT CERTIFICATES OR PRE-SHARED SYMMETRICAL KEYS

(71) Applicant: Huawei Technologies Co., Ltd., Shenzhen (CN)

(72) Inventors: Teng Wu, Waterloo (CA); Yin Tan, Waterloo (CA); Lionel Lianhong Zhang, Bellevue, WA (US)

(73) Assignee: Huawei Technologies Co., Ltd., Shenzhen (CN)

(*) Notice: Subject to any disclaimer, the term of this patent is extended or adjusted under 35 U.S.C. 154(b) by 105 days.

(21) Appl. No.: 15/711,797

(22) Filed: Sep. 21, 2017

(65) Prior Publication Data

US 2019/0089530 A1    Mar. 21, 2019

(51) Int. Cl.
H04L 9/08 (2006.01)
H04L 9/32 (2006.01)
H04L 9/14 (2006.01)
H04L 9/30 (2006.01)

(52) U.S. Cl.
CPC .......... *H04L 9/0819* (2013.01); *H04L 9/0838* (2013.01); *H04L 9/0861* (2013.01); *H04L 9/0894* (2013.01); *H04L 9/14* (2013.01); *H04L 9/30* (2013.01); *H04L 9/3247* (2013.01)

(58) Field of Classification Search
CPC ... H04L 9/0819; H04L 9/0861; H04L 9/0894; H04L 9/14; H04L 9/30; H04L 9/3247
See application file for complete search history.

(56) References Cited

U.S. PATENT DOCUMENTS

| | | | |
|---|---|---|---|
| 2004/0073796 A1 | 4/2004 | Kang et al. | |
| 2012/0082312 A1* | 4/2012 | Liu | H04L 9/0844 380/262 |
| 2016/0056959 A1* | 2/2016 | Blom | H04L 63/061 713/170 |
| 2016/0241389 A1* | 8/2016 | Le Saint | H04L 9/0844 |

FOREIGN PATENT DOCUMENTS

| | | |
|---|---|---|
| CN | 103560879 A | 2/2014 |
| WO | 2016033610 A1 | 3/2016 |
| WO | 2017140842 A1 | 8/2017 |

* cited by examiner

*Primary Examiner* — Oleg Korsak
(74) *Attorney, Agent, or Firm* — Slater Matsil, LLP (57) ABSTRACT

A method for securely receiving a cipher key from a key provider to a key requester is provided. The method includes generating a session key shared between the key requester and the key provider, determining at least one key in accordance with the session key. The method also includes transmitting a request from the key requester to the key provider, and receiving a response from the key provider, where the response comprises an encrypted payload and an authentication tag. The method also includes authenticating the response and decrypting the encrypted payload using the at least one key to obtain the cipher key.

24 Claims, 5 Drawing Sheets

SECURE KEY TRANSMISSION PROTOCOL WITHOUT CERTIFICATES OR PRE-SHARED SYMMETRICAL KEYS

TECHNICAL FIELD

The present invention relates to systems and methods for securely transmitting and receiving cipher keys over a communication channel.

BACKGROUND

Ciphering algorithms may be used to encrypt/decrypt plaintext information exchanged between two parties during an encrypted communication session. Before the encrypted communication session begins, the parties may participate in a key exchange procedure to establish which cipher key will be used for the session. During the key exchange procedure, one of the parties (the "key provider") will generally attempt to securely communicate the cipher key to the other party (the "key requester") over a public channel.

There are several types of conventional key exchange procedures presently available. One such type relies on a transport layer security (TLS) connection to communicate a cipher key over a public channel. Although relatively secure, establishing the TLS connection over the public channel may generally require the key requester and the key provider to exchange several handshakes, and as a result TLS-based procedures generally experience more latency and overhead than other procedures.

Another type of key exchange procedure relies on pre-shared symmetrical keys instead of dynamically allocating and exchanging a cipher key each time a communication session is initiated. The pre-shared symmetrical keys are generally shared by the key provider and the key requester through a secure channel, and may remain unchanged for a period of time (e.g., Wi-Fi Protected Access (WPA) encryption mode for home and small office networks). Because both the key requester and the key provider have to maintain the pre-shared keys, protocols that rely on pre-shared keys generally have significantly more key management overhead (typically, approximately twice the overhead) than protocols in which keys are managed solely by the key provider. As a result, key exchange procedures that rely on pre-shared keys may face scalability challenges that render them unsuitable for larger networks.

Yet another type of key exchange procedure relies on a third party certification authority (CA) to certify the cipher key exchange between the key requester and key provider. However, key exchange procedures that rely on third party CAs may be unsuitable for enterprise networks with high security requirements because they require the operator to trust a third party, as well as because the verification certificates issued by the third party CA generally require an internet connection, which may constitute an additional security vulnerability for isolated enterprise networks (e.g., enterprise intranet).

For these reasons, new key exchange procedures that have less latency than key exchange procedures that rely on TLS connections, less overhead than key exchange procedures that rely on pre-shared keys, and better cipher-key securitization than key exchange procedures that rely on third party CAs are desired.

SUMMARY

Technical advantages are generally achieved by embodiments of this disclosure which describe systems and methods for securely transmitting and receiving cipher keys over a communication channel.

In accordance with an embodiment, a method for securely receiving a cipher key from a key provider is provided. In this example, the method includes generating, by a key requester, a session key shared between the key requester and the key provider, determining at least one key in accordance with the session key, transmitting a request to the key provider, and receiving an encrypted payload and an authentication tag from the key provider. The method also includes authenticating the response based on the authentication tag in accordance with the at least one key, and decrypting the encrypted payload using the at least one key to obtain the cipher key, the cipher key being used by the key requester to establish a secure communication session. In one example, the request includes a second payload and a second authentication tag, where the second payload is encrypted using the at least one key, and the second authentication tag is determined based on the second payload in accordance with the at least one key.

Optionally, in such an example, or in any of the previous examples, determining the at least one key in accordance with the session key includes generating a single key in accordance with the session key, where the single key is used to encrypt the second payload, generate the second authentication tag, authenticate the response and decrypt the first encrypted payload.

Optionally, in such an example, or in any of the previous examples, determining the at least one key in accordance with the session key includes generating an authentication key and an encryption key in accordance with the session key, where the authentication key is used to generate the second authentication tag and authenticate the response, and the encryption key is used to encrypt the second payload and decrypt the first encrypted payload.

Optionally, in such an example, or in any of the previous examples, the second payload includes a type field indicating a type of the cipher key.

Optionally, in such an example, or in any of the previous examples, the second payload includes a token, where the token identifies the key requester and is determined during an authentication procedure between the key requester and the key provider prior to transmission of the request.

Optionally, in such an example, or in any of the previous examples, generating the session key includes determining, by the key requester, a private value and a first secret value in accordance with the private value, transmitting a session key request including the first secret value to the key provider, receiving a session key response including a second secret value from the key provider, and determining the session key in accordance with the private value and the second secret value.

Optionally, in such an example, or in any of the previous examples, the session key request includes a session freshness tag determined by the key requester, and the method further includes verifying that a session freshness tag in the session key response message matches the session key freshness tag in the session key request upon receiving the session key response.

Optionally, in such an example, or in any of the previous examples, the method further includes authenticating the session key response using a public signature, where the public signature is assigned to the key requester by the key provider prior to generating the session key, and the public signature belongs to a public-private signature pair generated by the key provider.

Optionally, in such an example, or in any of the previous examples, the session key is generated using a public key exchange protocol.

Optionally, in such an example, or in any of the previous examples, the public key exchange protocol is a Diffie-Hellman key exchange protocol.

Optionally, in such an example, or in any of the previous examples, the method further includes receiving, by a hardware key vault of the key requester, sensitive information from the key requester, and providing, by the hardware key vault, secure storage of the sensitive information, where providing secure storage of the sensitive information includes providing access to the sensitive information through hardware encrypted communications, and the sensitive information includes the session key, the at least one key, and the cipher key. A key requester for performing this method is also provided.

In accordance with another embodiment, a method for securely transmitting a cipher key to a key requester is provided. In this example, the method includes generating, by a key provider, a session key shared between the key provider and the key requester, determining at least one key in accordance with the session key, and receiving a request from the key requester. The method also includes transmitting a response comprising a payload and an authentication tag to the key requester, where the payload includes the cipher key, and is encrypted using the at least one key, and the authentication tag is determined based on the encrypted payload in accordance with the at least one key. In one example, the method further includes determining the cipher key in accordance with a type field included in the request, where the type field indicates a type of the cipher key, and including the type field in the payload of the response.

Optionally, in such an example, or in any of the previous examples, the method further includes verifying an identity of the key requester using a token included in the request, where the token is determined during an authentication procedure between the key requester and the key provider prior to transmission of the request.

Optionally, in such an example, or in any of the previous examples, the method further includes authenticating and decrypting the request using the at least one key.

Optionally, in such an example, or in any of the previous examples, generating the session key includes receiving, by the key provider, a session key request including a first secret value from the key requester, determining a second secret value in accordance with a private value, determining the session key in accordance with the private value and the first secret value, and transmitting a session key response including the second secret value to the key requester.

Optionally, in such an example, or in any of the previous examples, the session key response includes a session key authentication tag generated using a private signature, where the private signature belongs to a public-private signature pair determined prior to generation of the session key.

Optionally, in such an example, or in any of the previous examples, the method further includes obtaining a session freshness tag from the session key request and including the session freshness tag in the session key response. A key provider for performing this method is also provided.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the example designs and implementations illustrated and described herein, but may be modified within the scope of the appended claims along with their full scope of equivalents.

Aspects of this disclosure provide embodiment key exchange protocols that rely on a session key for encrypting and authenticating cipher keys. The session key may be generated by the key provider and the key requester based on public keys exchanged over a public channel and private keys of the key provider and the key requester. In particular, the key provider may send a public key of the key provider over the public channel, and the key requester may generate the session key based on the public key of the key provider and a private key of the key requester. Likewise, the key requester may send a public key of the key requester over the public channel, and the key provider may generate the session key based on the public key of the key requester and a private key of the key provider. The session key may then be used to generate encryption and authentication keys, which may be used to encrypt the cipher key and/or compute an authenticating tag by the key requester as well as to decrypt the cipher key and/or validate the authentication tag by the key provider.

Because the session key cannot be generated based solely on the public keys, it is generally not possible, or at least relatively difficult, for a third party to derive the session key by intercepting messages communicated over the public channel. Thus, embodiment protocols that rely on session keys for generating encryption/authentication keys prior to a cipher key exchange may be relatively secure. Likewise, embodiment protocols that rely on session keys for generating encryption/authentication keys prior to a cipher key exchange may generally communicate fewer messages than TLS-based protocols, and consequently may experience less overhead and latency than TLS-based protocols. Additionally, embodiment protocols do not rely on a third party and do not require pre-sharing of keys, and as a result, may be more efficient key exchange protocols that rely on pre-shared keys as well as more secure than key exchange protocols that rely on a third party CA.

In one embodiment, the key requester generates a session key shared between the key requester and the key provider, determines at least one key in accordance with the session key, transmits a request to the key provider, and receives a response including a first encrypted payload and a first authentication tag from the key provider. The requester authenticates the response based on the first authentication tag in accordance with the at least one key, and decrypt the first encrypted payload using the at least one key to obtain a cipher key, the cipher key being used by the key requester to establish a secure communication session.

In another embodiment, the request includes a second payload and a second authentication tag, where the second payload is encrypted using the at least one key, and the second authentication tag is determined based on the second payload in accordance with the at least one key.

In another embodiment, determining the at least one key in accordance with the session key includes generating a single key in accordance with the session key, the single key being used to encrypt the second payload, generate the second authentication tag, authenticate the response and decrypt the first encrypted payload.

In another embodiment, determining the at least one key in accordance with the session key includes generating an authentication key and an encryption key in accordance with the session key, where the authentication key is used to generate the second authentication tag and authenticate the response, and the encryption key is used to encrypt the second payload and decrypt the first encrypted payload.

In another embodiment, the second payload includes a type field indicating a type of the cipher key.

In another embodiment, the second payload includes a token, the token identifying the key requester and being determined during an authentication procedure between the key requester and the key provider prior to transmission of the request.

In another embodiment, in order to generate the session key, the key requester first determines a private value and a first secret value in accordance with the private value. The key requester transmits a session key request including the first secret value to the key provider, and receives a session key response including a second secret value from the key provider. The session key is determined in accordance with the private value and the second secret value.

In another embodiment, the session key request includes a session freshness tag determined by the key requester. The key requester verifies that a session freshness tag in the session key response matches the session freshness tag in the session key request upon receiving the session key response.

In another embodiment, the key requester authenticates the session key response using a public signature, which is assigned to the key requester by the key provider prior to generating the session key. The public signature belongs to a public-private signature pair generated by the key provider.

In another embodiment, the session key is generated using a public key exchange protocol.

In another embodiment, the public key exchange protocol is a Diffie-Hellman key exchange protocol.

In another embodiment, a hardware key vault of the key requester receives sensitive information from the key requester, and provides secure storage of the sensitive information, where providing secure storage of the sensitive information includes providing access to the sensitive information through hardware encrypted communications, the sensitive information comprising the session key, the at least one key, and the cipher key.

In another embodiment, the key provider generates a session key shared between the key provider and the key requester, determines at least one key in accordance with the session key, receives a request from the key requester, and transmits a response including a payload and an authentication tag to the key requester, where the payload includes the cipher key and is encrypted using the at least one key, the authentication tag is determined based on the encrypted payload in accordance with the at least one key, and the cipher key is used by the key requester to establish a secure communication session.

In another embodiment, the key provider determines the cipher key in accordance with a type field included in the request, the type field indicating a type of the cipher key, and includes the type field in the payload of the response.

In another embodiment, the key requester and the key provider determine a token during an authentication procedure between the key requester and the key provider prior to transmission of the request. The key provider verifies an identity of the key requester using the token included in the request.

In another embodiment, the key provider authenticates and decrypts the request using the at least one key.

In another embodiment, in order to generate the session key, the key provider receives a session key request including a first secret value from the requester. The key provider then determines a second secret value in accordance with a private value, and transmits a session key response including the second secret value to the key requester. The session key is determined in accordance with the private value and the first secret value.

In another embodiment, the session key response includes a session key authentication tag generated using a private signature, where the private signature belongs to a public-private signature pair determined prior to generation of the session key.

In another embodiment, the key provider obtains a session freshness tag from the session key request and includes the session freshness tag in the session key response.

The above aspects and other inventive aspects are discussed in greater detail below.

Figure 1:
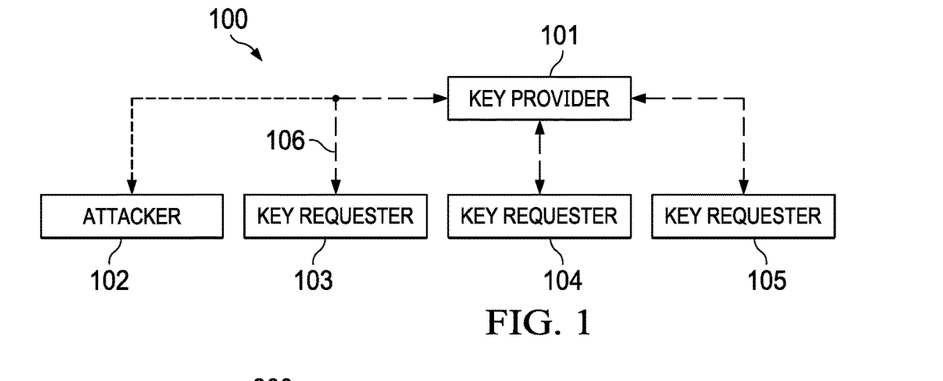
FIG. 1 is a diagram of an embodiment of a key distribution network.

FIG. 1 illustrates a key distribution network 100 comprising a key provider 101 and key requesters 103, 104, and 105. Each key requester may obtain a cipher key from key provider 101 through a distribution channel between them (e.g., channel 106 connecting key provider 101 and key requester 103). The key requesters may use cipher keys to encrypt their communication data. It should be appreciated that the encryption may be applied to a communication session between a key requester and key provider 101, or between a key requester and another device, which might be another key requester in network 100, or a device outside network 100. Key provider 101 may manage more than one cipher key for each key requester, each cipher key serving a specific purpose. For instance, cipher keys may be used for integrity protection, authentication, data encryption, generation of digital signatures, etc. During transmission of a cipher key, information transmitted on the distribution channel could be intercepted by an attacker that is eavesdropping on the distribution channel. For example, as illustrated in FIG. 1, an attacker 102 might intercept information transmitted over channel 106, extract the cipher key from the intercepted information, and then use the cipher key to decrypt key requester 103's communication. If both key provider 101 and key requester 103 apply a secure key transmission technique, attacker 102 may not be able to obtain the cipher key even when data transmitted through channel 106 is intercepted.

Figure 2:
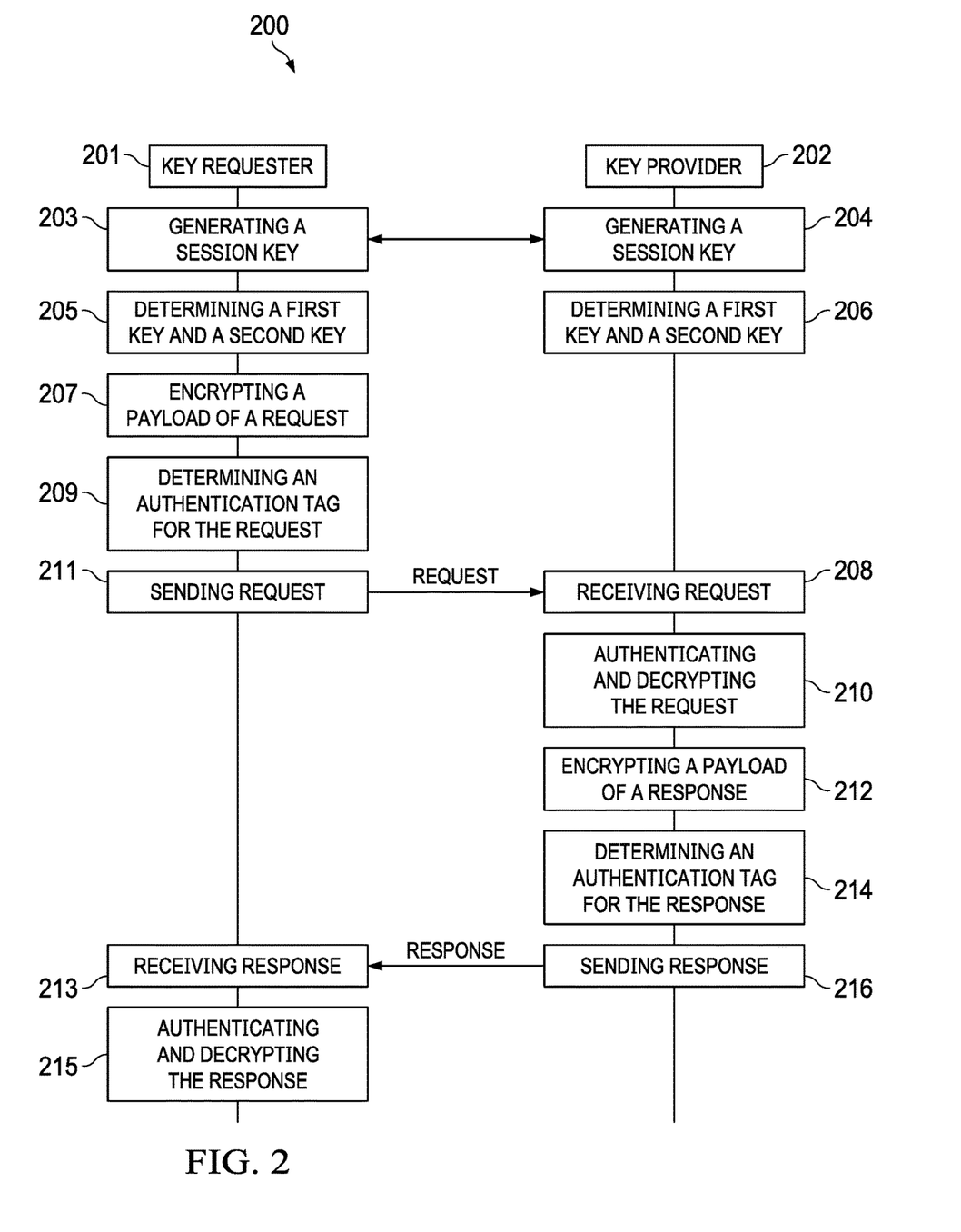
FIG. 2 is a diagram of an embodiment key exchange protocol.

FIG. 2 illustrates a method 200 for performing the proposed secure key transmission protocol. In one embodiment, key requester 201 and key provider 202 first work together and generate a session key in steps 203 and 204, respectively. Key requester 201 and key provider 202 may exchange a plurality of messages during generation of the session key. In steps 205 and 206, each of them separately determines a first key and a second key based on the generated session key using a key derivation technique. For instance, the 3rd Generation Partnership Project (3GPP) standards have developed the MILENAGE algorithm set and the TUAK algorithm set for the key generation functions. In steps 207 and 209, key requester 201 generates a request message which is used to notify key provider 202 that a cipher key is required. In step 207, key requester 201 encrypts a payload of the request message using the first key. In step 209, key requester 201 determines an authentication tag in accordance with the encrypted payload and the second key. The request message comprises the encrypted payload and the authentication tag. In step 211, key requester 201 sends the request message to key provider 202. Key provider 202 receives the request message in step 208. In step 210, key provider 202 may first authenticate the request message using the second key, and then decrypt the payload of the request message using the first key. In steps 212 and 214, key provider 202 generates a response message which is used to carry a cipher key allocated for key requester 201. In step 212, key provider 202 encrypts a payload of the response message, which comprises the allocated cipher key. In step 214, key provider 202 determines an authentication tag in accordance with the encrypted payload and the second key. The response message comprises the encrypted payload and the authentication tag. In step 216, key provider sends the response message to key requester 201. Key requester 201 receives the response message in step 213. In step 215, key requester 201 first authenticates the response message using the second key, and then decrypts the payload of the response message using the first key.

Various encryption and authentication algorithms may be used in steps 207 and 209. For instance, an advanced encryption standard cipher algorithm in cipher block chaining mode (AES-CBC) may be used for the encryption in step 207, and a cipher block chaining message authentication code (CBC-MAC) technique may be used to generate the authentication tag in step 209. Because the first key is used for the encryption and the second key is used for the authentication, selection of the encryption and the authentication algorithms may affect how the first key and the second key are derived. In one embodiment, different keys are used for encrypting the message and generating the authentication tag. For example, one key may be used to encrypt the message using an AES-CBC encryption algorithm, and another key may be used to generate the authentication tag using a CBC-MAC authentication algorithm. In another embodiment, the same key is used for encrypting the message and generating the authentication tag. For example, the same key may be used to both encrypt the message, and generate the authentication tag in accordance with an advanced encryption standard Galois/counter mode (AES-GCM) authenticated encryption algorithm.

In some embodiments, the key requester may use a plurality of cipher keys. When requesting a cipher key, the key requester can include a key type in the request message indicating what type of cipher key the key requester needs. When the key provider receives the request message, the key provider first allocates a cipher key in accordance with the key type, and then includes both the cipher key and the key type in the response message. When receiving the response message, the key requester extracts the key type and verifies that the key type is the same as the key type in the request message.

Figure 3:
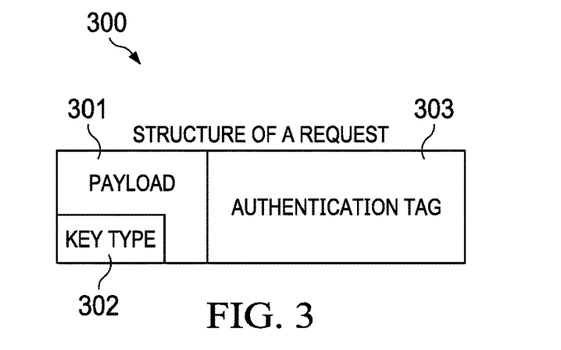
FIG. 3 is a diagram of an embodiment key exchange request message.
Figure 4:
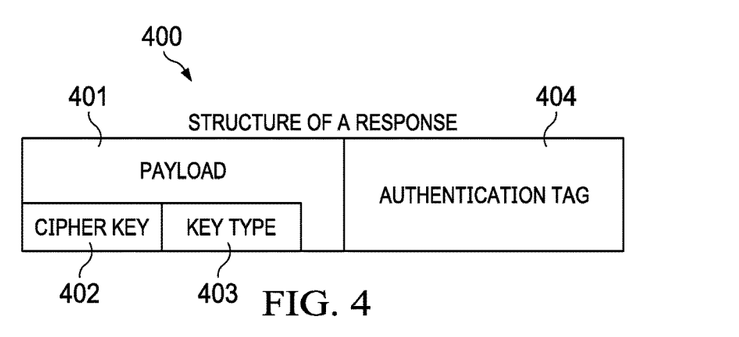
FIG. 4 is a diagram of an embodiment key exchange response message.

FIG. 3 illustrates an example of a structure of a request message. As shown in structure 300, the request message comprises a payload 301 and an authentication tag 303. Payload 301 comprises a key type 302. FIG. 4 illustrates an example of a structure of a response message. As shown in structure 400, the response message comprises a payload 401 and an authentication tag 404. Payload 401 comprises a cipher key 402 and a key type 403. It should be understood that both payload 301 and payload 401 are encrypted using the first key. Authentication tag 303 is determined in accordance with the content of payload 301 and the second key. Authentication tag 404 is determined in accordance with the content of payload 401 and the second key.

Figure 5:
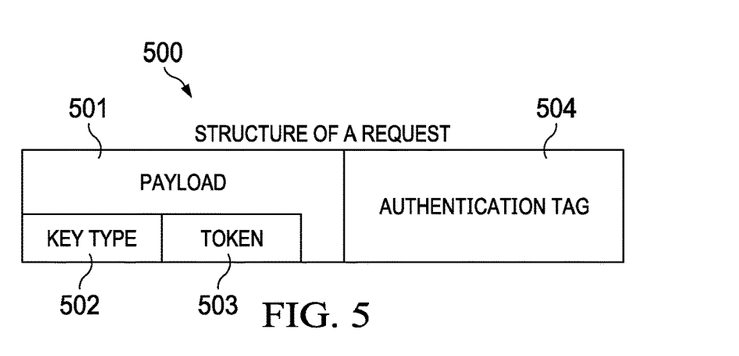
FIG. 5 is a diagram of another embodiment key exchange request message.

In another embodiment, for better security protection, the key provider may verify the identity of the key requester during the key transmission. To this end, there is an authentication procedure between the key provider and the key requester prior to the transmission of the request message. During the authentication procedure, the key provider verifies the identity of the key requester, and assigns a token to the key requester. The token is determined by the key provider in accordance with the identity of the key requester. After receiving the token, the key requester securely stores the token. In a secure key transmission protocol, the key requester may include the token in the request message. FIG. 5 illustrates an example of a structure of a request message comprising a token. As shown in structure 500, the request message comprises a payload 501 and an authentication tag 504. Payload 501 comprises a key type 502 and a token 503. When receiving the request message, the key provider extracts the token from the payload of the request message, and verifies the identity of the key requester using the token.

Figure 6:
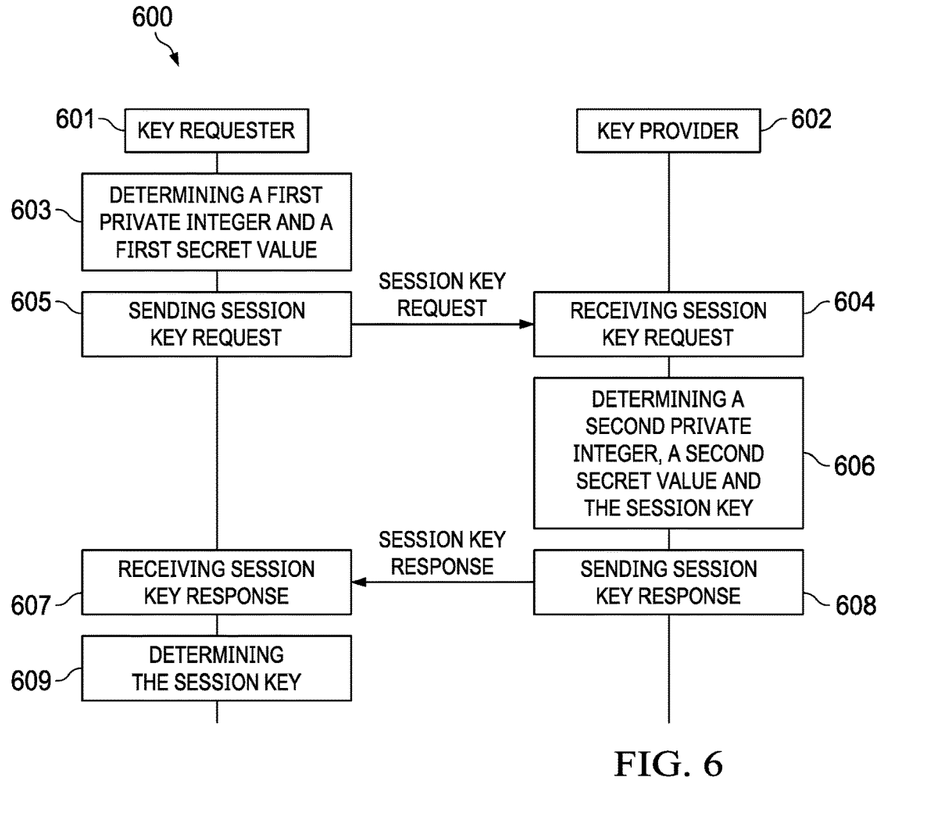
FIG. 6 is a diagram of an embodiment protocol for generating a session key.

FIG. 6 illustrates an embodiment of a method for performing the session key generation procedure in steps 203 and 204 of FIG. 2. In step 603, key requester 601 first determines a first private value, and then determines a first secret value in accordance with the first private value. In one example, the first private value is determined by randomly selecting an integer a satisfying $1 \leq a \leq p-2$, where p is a prime number. The first secret value may be chosen as $A = g^a$ mod p, where A is the first secret value, g is a primitive root modulo p, and mod represents the modulo function. The first private value is kept to key requester 601 itself. The first secret value is included in a session key request message. In step 605, key requester 601 sends the session key request message key provider 602. In step 604, key provider 602 receives the session key request message and extracts the first secret value. In step 606, key provider 602 first determines a second private value, and then determines a second secret value in accordance with the second private value. Key provider 602 also determines the session key in accordance with the first secret value and the second private value in step 606. An example of determining the second private value is to randomly select an integer b satisfying $1 \leq b \leq p-2$, and an example of determining the second secret value is $B = g^b \mod p$, where B is the second secret value, g and p are the same parameters used by key requester 601 for generating the first private value and the first secret value. Key provider 602 may determine the session key as $A^b \mod p = g^{ab} \mod p$. It should be understood that in this example key requester 601 and key provider 602 share the values of both g and p, which can be achieved by both key requester 601 and key provider 602 making an agreement prior to the session key generation procedure. Alternatively, this can be achieved by transferring g and p from key requester 601 to key provider 602 using the session key request message. In step 608, key provider 602 includes the second secret value in a session key response message, and sends the session key response message to key requester 601. In step 607, key requester 601 receives the session key response message and extracts the second secret value from the session key response message. In step 609, key requester 601 determines the session key in accordance with the first private value and the second secret value. For example, the session key is determined as $B^a \mod p = g^{ab} \mod p$, which is the same as the value determined by key provider 602.

The purpose of the above session key generation procedure is to achieve forward security. If an attacker intercepts the communication between the key provider and the key requester, the attacker can obtain the first secret value and the second secret value carried by the session key request message and the session key response message. However, the attacker cannot determine the session key because at least one of the first private integer and the second private integer is required in order to derive the value of the session key, and the first and the second private integers are not transmitted through the distribution channel between the key provider and the key requester. In some embodiments, a public key exchange protocol (e.g., Diffie-Hellman key exchange protocol) may be implemented in the session key generation procedure.

Figure 7:
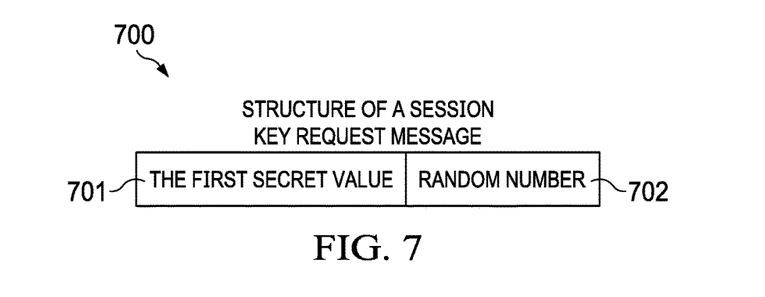
FIG. 7 is a diagram of an embodiment session key request message.
Figure 8:
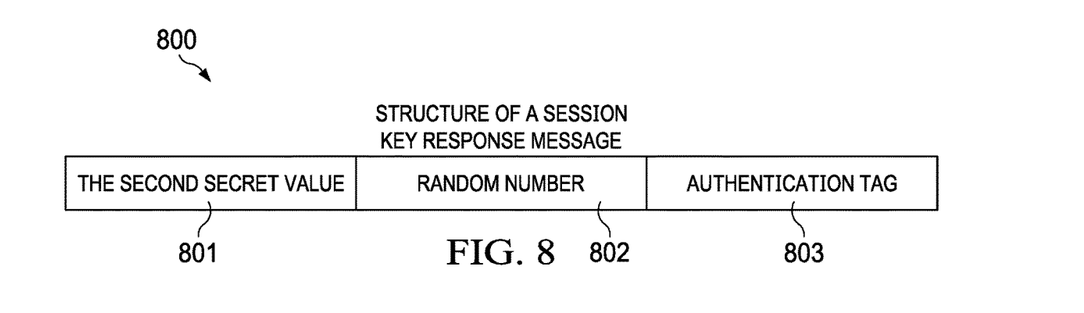
FIG. 8 is a diagram of an embodiment session key response message.

In some embodiments, a random number and an asymmetrical authentication technique may provide extra protection to the session key request and response messages. A public-private signature pair is used for the asymmetrical authentication procedure. The private signature is known only to the key provider. The public signature is known to both the key provider and the key requester. The public signature may be provisioned to the key requester through a reliable source (e.g., a face-to-face communication) prior to the session key generation procedure. As shown in FIG. 7, the session key request message 700 comprises a first secret value 701 and a random number 702 generated by the key requester. The key provider extracts the random number when receiving the session key request message, and includes the random number in the session key response message. As shown in FIG. 8, the session key response message 800 comprises a second secret value 801, the random number 802 extracted from the session key request message, and an authentication tag 803. Authentication tag 803 is determined by the key provider in accordance with the second secret value 801, the random number 802, and the private signature. When the key requester receives the session key response message, the key requester first authenticates the session key response message using the public signature, and then verifies that the random number included in the session key response message is the same as the session key request message.

The random number in the session key generation procedure is used to guarantee the freshness of the authentication tag in the session key response message. Information from a previous session key generation procedure generally cannot be used for a subsequent session key generation procedure because the random number is generally updated between successive session key generation procedures. The asymmetrical authentication technique may also provide more security protection. Even if the second private integer in the key provider is lost, the attacker cannot deceive the key requester using the second secret value because the attacker still requires the private signature of the key provider to generate the authentication tag.

In some embodiments, the key requester uses a hardware key vault to provide an enhanced and hardware-assisted secure key transmission. The hardware key vault stores and protects sensitive information of the secure key transmission protocol by a hardware-assisted mechanism. The hardware key vault also performs computation involved with the sensitive information (e.g., the encryption and the authentication). The sensitive information comprises one or more of the cipher key, the token, the session key, the first and second keys, the public authentication key and the first private integer. Once the sensitive information is stored in the hardware key vault, it is not permitted to leave the hardware key vault in plaintext.

Figure 9:
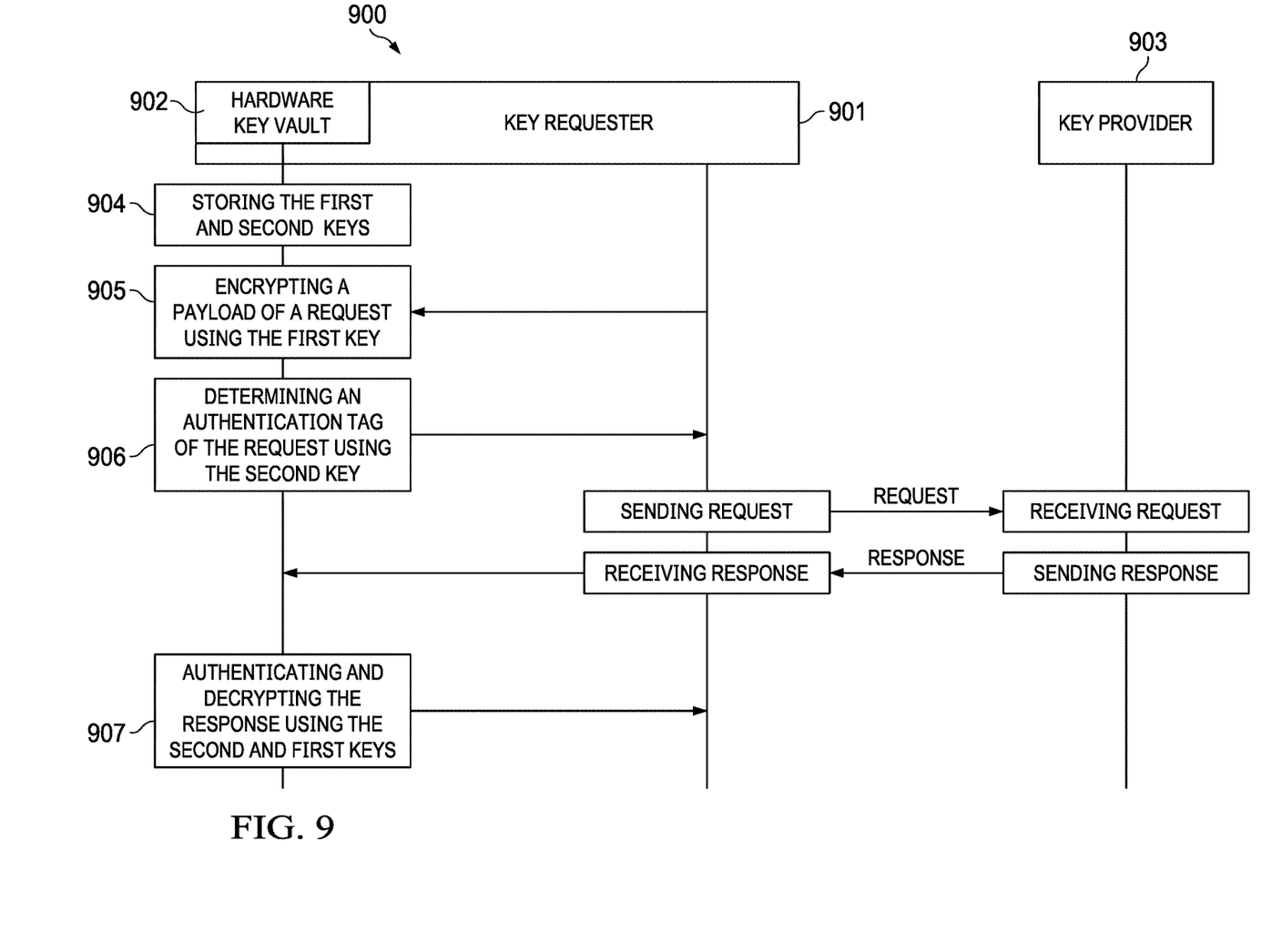
FIG. 9 is a diagram of an embodiment enhanced and hardware-assisted secure key transmission protocol.

FIG. 9 illustrates an example of a method performing an enhanced secure key transmission protocol. It should be understood that FIG. 9 focuses on the key requester generating the request message and receiving the response message, and some steps for generation of the session key and some actions of the key provider are not shown in FIG. 9. In FIG. 9, it is shown that a key requester 901 comprises a hardware key vault 902. It is assumed that the session key has been successfully generated. The first key and the second key are determined in accordance with the session key, and are stored in hardware key vault 902 in step 904. For better protection, computations involved with the first key and the second key are performed by hardware key vault 902. In order to generate the request message, hardware key vault 902 encrypts the payload of the request using the first key in step 905, and determines the authentication tag of the request in accordance with the encrypted payload and the second key. Key requester 901 obtains the encrypted payload and the authentication tag from hardware key vault 902, builds the request message, and then sends the request message to key provider 903. After receiving the response message, key requester 901 provides the content of the response message to hardware key vault 902. Hardware key vault 902 authenticates the response message using the second key, decrypts the payload of the response message using the first key, and then sends the authentication and decryption results to key requester 901. Although in this example hardware key vault 902 only stores the first and second keys, it should be understood that the token for authenticating the identity of the key requester may also be stored and protected by hardware key vault 902.

The hardware key vault may also be used in the session key generation procedure and may increase the security level of the session key generation procedure. In some embodiments where an asymmetrical authentication technique is used in the session key generation, the hardware key vault may store the public authentication key for the key requester. When the key requester receives the session key response message, the key requester sends the content of the session key response message to the hardware key vault. The hardware key vault authenticates the session key response message using the public authentication key and then sends the results back to the key requester.

Figure 10:
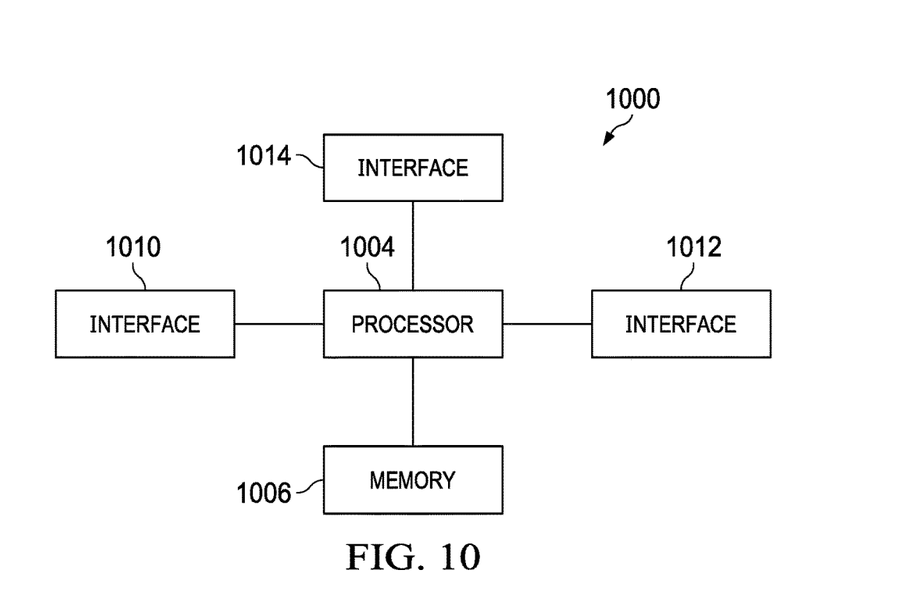
FIG. 10 is a block diagram of an embodiment processing system.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, and 1014 may be any component or collection of components that allow the processing system 1000 to communicate with other devices/components and/or a user. For example, one or more of the interfaces 1010, 1012, and 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a UE, a PC, a tablet, a wearable communications device (e.g., a smartwatch, etc.), or any other device adapted to access a telecommunications network.

Figure 11:
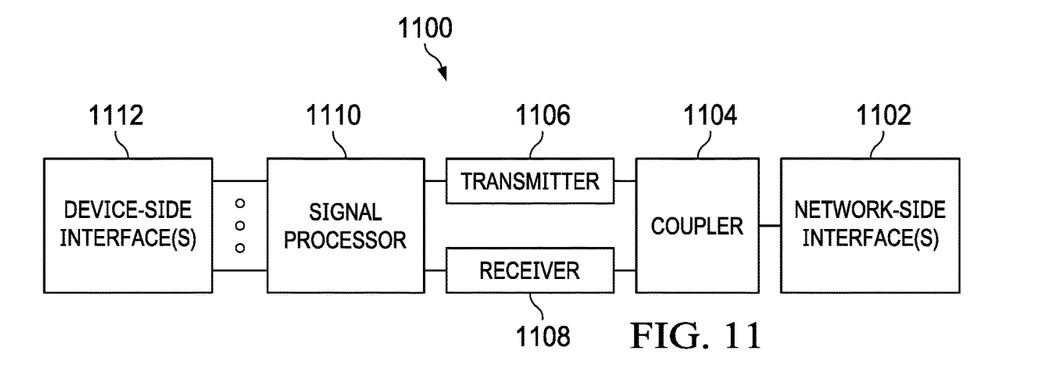
FIG. 11 is a block diagram of an embodiment transceiver.

In some embodiments, one or more of the interfaces 1010, 1012, and 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for securely receiving a cipher key from a key provider, the method comprising:

generating, by a key requester, a session key shared between the key requester and the key provider;

determining, by the key requester, at least one key in accordance with the session key, the at least one key including an encryption key;

transmitting, by the key requester, a request including a payload to the key provider, the payload encrypted with the encryption key;

receiving, by the key requester, a response including the cipher key from the key provider, the cipher key encrypted with the encryption key;

authenticating, by the key requester, the response in accordance with the at least one key; and decrypting, by the key requester, the cipher key from the response using the encryption key, the cipher key being used by the key requester to encrypt a secure communication session.

2. The method of claim 1, wherein the request further includes a first-authentication tag determined based on the payload of the request in accordance with the at least one key.

3. The method of claim 2, wherein the encryption key is used to encrypt the payload of the request, generate the first authentication tag, authenticate the response and decrypt the response.

4. The method of claim 2, wherein determining the at least one key in accordance with the session key comprises generating an authentication key and the encryption key in accordance with the session key, wherein the authentication key is used to generate the first authentication tag and authenticate the response, and the encryption key is used to encrypt the payload of the request and decrypt the response.

5. The method of claim 2, wherein the payload comprises a type field indicating a type of the cipher key.

6. The method of claim 2, wherein the payload comprises a token, the token identifying the key requester and being determined during an authentication procedure between the key requester and the key provider prior to transmission of the request.

7. The method of claim 1, wherein generating the session key comprises:

determining, by the key requester, a private value and a first secret value in accordance with the private value;

transmitting, by the key requester, a session key request comprising the first secret value to the key provider;

receiving, by the key requester, a session key response comprising a second secret value from the key provider; and determining, by the key requester, the session key in accordance with the private value and the second secret value.

8. The method of claim 7, wherein the session key request comprises a session freshness tag determined by the key requester, and wherein the method further comprises verifying that a session freshness tag in the session key response matches the session freshness tag in the session key request upon receiving the session key response.

9. The method of claim 7, further comprising authenticating the session key response using a public signature, wherein the public signature is assigned to the key requester by the key provider prior to generating the session key, and the public signature belongs to a public-private signature pair generated by the key provider.

10. The method of claim 1, wherein the session key is generated using a public key exchange protocol.

11. The method of claim 10, wherein the public key exchange protocol is a Diffie-Hellman key exchange protocol.

12. The method of claim 1, further comprising:

receiving, by a hardware key vault of the key requester, sensitive information from the key requester; and providing, by the hardware key vault, secure storage of the sensitive information, wherein providing secure storage of the sensitive information comprises providing access to the sensitive information through hardware encrypted communications, the sensitive information comprising the session key, the at least one key, and the cipher key.

13. A method for securely transmitting a cipher key to a key requester, the method comprising:

generating, by a key provider, a session key shared between the key provider and the key requester;

determining, by the key provider, at least one key in accordance with the session key, the at least one key including an encryption key;

receiving, by the key provider, a request including a payload from the key requester, the payload encrypted with the encryption key; and transmitting, by the key provider, a response including the cipher key to the key requester, the cipher key encrypted with the encryption key and used by the key requester to encrypt a secure communication session.

14. The method of claim 13, further comprising:

determining the cipher key in accordance with a type field included in the request, the type field indicating a type of the cipher key; and including the type field in the response.

15. The method of claim 13, further comprising:

verifying an identity of the key requester using a token included in the request, the token being determined during an authentication procedure between the key requester and the key provider prior to transmission of the request.

16. The method of claim 13, further comprising authenticating and decrypting the request using the at least one key.

17. The method of claim 13, wherein generating the session key comprises:

receiving, by the key provider, a session key request comprising a first secret value from the key requester;

determining, by the key provider, a second secret value in accordance with a private value;

determining, by the key provider, the session key in accordance with the private value and the first secret value; and transmitting, by the key provider, a session key response comprising the second secret value to the key requester.

18. The method of claim 17, wherein the session key response comprises a session key authentication tag generated using a private signature, the private signature belonging to a public-private signature pair determined prior to generation of the session key.

19. The method of claim 17, further comprising obtaining a session freshness tag from the session key request and including the session freshness tag in the session key response.

20. A key requester for securely receiving a cipher key from a key provider, the key requester comprising:

a processor; and a non-transitory computer readable storage medium storing programming for execution by the processor, the programming including instructions to:

generate a session key shared between the key requester and the key provider;

determine at least one key from the session key, the at least one key including an encryption key;

transmit a request including a payload to the key provider, the payload encrypted with the encryption key;

receive a response including the cipher key from the key provider, the cipher key encrypted with the encryption key;

authenticate the response in accordance with the at least one key; and decrypt, by the key requester, the cipher key from the response using the encryption key, the cipher key being used to encrypt a secure communication session.

21. The key requester of claim 20, further comprising a hardware key vault receiving sensitive information from the key requester and providing secure storage of the sensitive information, wherein providing secure storage of the sensitive information comprises providing access to the sensitive information through hardware encrypted communications, the sensitive information comprising the session key, the at least one key, and the cipher key.

22. A key provider for securely transmitting a cipher key to a key requester, the key provider comprising:

a processor; and a non-transitory computer readable storage medium storing programming for execution by the processor, the programming including instructions to:

generate a session key shared between the key provider and the key requester;

determine at least one key from the session key, the at least one key including an encryption key;

receive a request including a payload from the key requester, the payload encrypted with the encryption key; and transmit a response including the cipher key to the key requester, the cipher key encrypted with the encryption key and used by the key requester to encrypt a secure communication session.

23. The method of claim 1, wherein the response further includes a second authentication tag determined in accordance with the encrypted cipher key and the at least one key.

24. The method of claim 13, wherein the response further includes an authentication tag determined in accordance with the encrypted cipher key and the at least one key.

* * * * *